Patented Feb. 13, 1923.

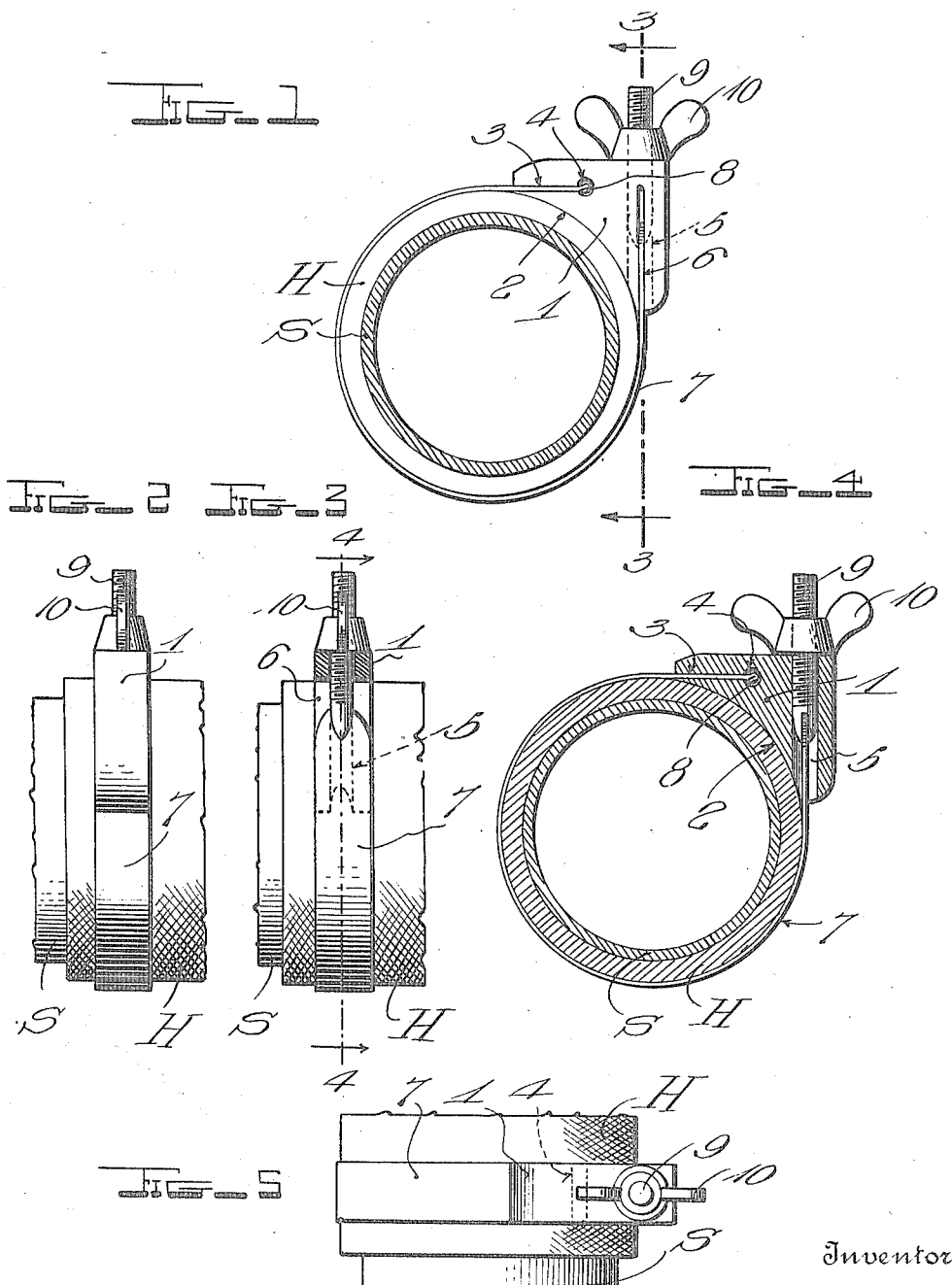

1,445,568

UNITED STATES PATENT OFFICE.

HENRY P. TERHEIDE, OF ANDERSON, INDIANA.

HOSE CLAMP.

Application filed August 14, 1922. Serial No. 581,723.

*To all whom it may concern:*

Be it known that I, HENRY P. TERHEIDE, a citizen of the United States, residing at Anderson, in the county of Madison and State of Indiana, have invented certain new and useful Improvements in Hose Clamps; and I do declare the following to be a full, clear, and exact description of the invention, such as will enable others skilled in the art to which it appertains, to make and use the same.

This invention relates to clamps or draw bands which are intended primarily for securing the end portions of flexible rubber hose to rigid pipes or other elements, but which are capable of being used for many other purposes.

The invention has been designed in order to provide a hose clamp or draw band of this character which may be adjusted to fit upon devices of various sizes and which can be tightened without the use of tools so as to effect a binding engagement with the device upon which it is fitted. At the same time the invention has been designed in order to provide a very strong and durable and yet a simple device that can be very cheaply and economically made.

The novelty in the invention resides in the various details of construction, and the combination and arrangement of parts, as are hereinafter fully described and claimed and shown in the accompanying drawing.

In the accompanying drawing in which similar reference characters are used to designate corresponding parts throughout the several views:—

Fig. 1 is an end elevation of a clamp constructed in accordance with the invention, illustrating it applied to secure one end of a flexible rubber hose to a section of a metal pipe;

Fig. 2 is an elevation of one side of the clamp;

Fig. 3 is a section of the clamp taken substantially on the plane indicated by the line 3—3 of Fig. 1;

Fig. 4 is a section taken substantially on the plane indicated by the line 4—4 of Fig. 3; and Fig. 5 is a plan view of the clamp.

The improved clamp comprises a metal clamping head 1, which is of substantially triangular shape, having one of its edges curved as at 2. One end of the head 1 is provided with a comparatively deep but very narrow groove 3. The groove 3 extends substantially parallel with another edge of the head 1, and its bottom portion 4 is of increased thickness, this being formed by drilling an aperture of a greater diameter than the width of the groove 3 transversely through the head 1.

Drilled through the head 1 and extending at right angles to the groove 3 and parallel with the remaining edge of the head is an aperture 5. The head 1 is also provided with a considerably deep but very narrow groove 6, which extends at right angles to the groove 3 and parallel to the last mentioned edge of the head from the remaining end of the latter which is bounded on one edge by the curved edge 2. The groove 6 intersects the apertures 5.

In addition to the head 1 the clamp includes a metal band 7. One end of this band is disposed in the groove 3 and is provided with a headed portion 8 located in the wide bottom portion 4 of the groove 3. This headed portion 8 is preferably formed by turning one end portion of the band backwardly upon itself. Secured in any suitable manner to the other end of the band 7 and extending longitudinally therefrom is a screw 9. This end portion of the band is slidable in the groove 6, and the screw 9 operates in the opening 5. After the parts have been assembled in this manner a wing nut 10 is threaded upon the free end of the screw 9 which projects above the upper edge of the head 1.

The clamp or draw band may be used for numerous purposes, but it is intended primarily to be used in securing or clamping one end of a flexible rubber hose or the like to a metal pipe section or other supporting element, and in the drawing it is illustrated as securing a piece of hose H to the metal pipe section S. In applying the clamp, the wing nut 10 must first be unscrewed so that the band 7 will fit loosely around the piece of hose H, and then the latter carrying the clamp should be placed upon the end of the pipe section S. After that has been done the wing-nut 10 should be turned so as to draw upon the screw 9 and the end of the band 7 carrying said screw. This will tighten the band 7 around the piece of hose 8 and cause it to conform to the contour of the hose so that the latter will be firmly secured or bound to the pipe section S.

By having the screw 9 of considerable length, the device may be adjusted to be used in connection with objects of various sizes.

From the foregoing description, taken in connection with the accompanying drawing, the construction, use and advantages of the invention will be readily understood without further description.

It is obvious that various changes in form, proportion, and in the minor details of construction may be resorted to without departing from the principle of the invention or sacrificing any of the advantages thereof, and hence it is to be understood that such changes may be made within the meaning and scope of the appended claims.

What is claimed is:

1. A device of the character described comprising a substantially triangular clamping head having one edge curved inwardly to fit around a curved object and having comparatively deep but narrow grooves extending at right angles to each other and from adjacent corners thereof adjacent to its curved edge, said head being further provided with an aperture extending entirely therethrough and longitudinally with respect to one of said grooves, a clamping band having one end fitted in and secured in the other groove, the other end of said band being disposed in the first mentioned groove, a screw secured to said other end of said band and operating through said aperture, and a nut disposed upon the free end of said screw.

2. A device of the class described comprising a substantially triangular shaped clamping head having one edge curved inwardly to adapt it to fit around a curved object and having a comparatively deep but narrow groove extending from one of its ends which is adjacent to its curved end, said head being also provided with another comparatively deep and narrow groove extending from the other of its ends which is adjacent to its curved edge and also an aperture extending longitudinally of the last mentioned groove and entirely through said head, the bottom of the first mentioned groove being widened, a clamping band having one end fitted in the first mentioned groove and having this end enlarged and disposed in the widened portion of the latter, the other end of said band being disposed in the last mentioned groove, a screw secured to said other end of said band and extending through said aperture and a nut threaded upon the free end of said screw.

In testimony whereof I have hereunto affixed my signature.

HENRY P. TERHEIDE.